United States Patent
Xiao et al.

(10) Patent No.: US 11,015,028 B2
(45) Date of Patent: May 25, 2021

(54) PLASTIC ARTICLES CONTAINING SUSPENDED PHOTOCHROMIC DYE MOLECULES

(71) Applicant: ZHEJIANG JINGYI NEW MATERIAL TECHNOLOGY CO., LTD, Zhejiang (CN)

(72) Inventors: Shuyong Xiao, St-Laurent (CA); Shiyong Zhao, Longueuil (CA); Dawei Zhang, Lachine (CA)

(73) Assignee: ZHEJIANG JINGYI NEW MATERIAL TECHNOLOGY CO., LTD, Zhejiang (CN)

( * ) Notice: Subject to any disclaimer, the term of this patent is extended or adjusted under 35 U.S.C. 154(b) by 0 days.

(21) Appl. No.: 16/034,829

(22) Filed: Jul. 13, 2018

(65) Prior Publication Data
US 2020/0339765 A1    Oct. 29, 2020

(51) Int. Cl.
| | | |
|---|---|---|
| *C08K 9/10* | (2006.01) | |
| *C08J 3/20* | (2006.01) | |
| *C09B 55/00* | (2006.01) | |
| *C09D 7/41* | (2018.01) | |

(52) U.S. Cl.
CPC .............. *C08J 3/203* (2013.01); *C09B 55/009* (2013.01); *C09D 7/41* (2018.01)

(58) Field of Classification Search
CPC ......... C08J 3/203; C08J 3/023; C09B 55/009; C09D 7/41; C08K 9/10

USPC ........................................................ 523/201
See application file for complete search history.

(56) References Cited

U.S. PATENT DOCUMENTS

| | | | | |
|---|---|---|---|---|
| 6,936,193 B2* | 8/2005 | Saxe | ....................... | G02F 1/172 252/583 |
| 7,791,788 B2* | 9/2010 | Slovak | ................. | C09D 183/06 359/296 |
| 2005/0248696 A1* | 11/2005 | Miller | ....................... | B01J 13/10 349/86 |
| 2010/0147879 A1* | 6/2010 | Ophardt | ............... | A47K 5/1217 222/52 |
| 2011/0189462 A1* | 8/2011 | Shihui | ................. | C09B 67/0013 428/304.4 |
| 2011/0198546 A1* | 8/2011 | Choi | .................... | C07D 498/10 252/586 |
| 2015/0275090 A1* | 10/2015 | Wang | .................. | C09K 19/544 252/299.01 |
| 2017/0186514 A1* | 6/2017 | Chopra | ..................... | C08L 9/06 |

* cited by examiner

*Primary Examiner* — Hannah J Pak
(74) *Attorney, Agent, or Firm* — Yue (Robert Xu; Apex Attorneys at Law, LLP

(57) ABSTRACT

The present invention provides a plastic article containing suspended photochromic dye molecules, and the said suspended photochromic dye molecules suspended in liquid micro-droplets of a suspension medium, and the said micro-droplets of the said suspension medium containing the said suspended photochromic dye molecules are embedded inside a solid polymer matrix, and the said solid polymer matrix is formed by polymerization of liquid polymer precursors. The invented structure of a plastic article containing suspended photochromic dye molecules exhibits fast response time and enhances photochromic performance.

10 Claims, 4 Drawing Sheets

PLASTIC ARTICLES CONTAINING SUSPENDED PHOTOCHROMIC DYE MOLECULES

TECHNICAL FIELD

The present invention is related to a light control film based on suspended photochromic molecules, such a film is capable of photochromic controlling the light transmission, and can be used for smart windows.

BACKGROUND ART

Photochromism in general describes compounds that undergo a reversible photochemical reaction where an absorption band in the visible light changes dramatically in strength or wavelength. A chemical molecule which is capable of changing color under a photo radiation is referred as a photochromic molecule.

Phtochromic molecules are well known in prior arts, and many molecular structures such as, triarylmethanes, stilbenes, azastilbenes, nitrones, fulgides, spiropyrans, naphthopyrans, spiro-oxazines and quinones have been extensively studied. As an example, FIG. 1 shows the chemical configuration transforming of a typical family of spiro-napthoxzine photochromic molecules. The Spiro form of an oxazine is a colorless leuco molecule; the conjugated system of the oxazine and another aromatic part of the molecule is separated by a $sp^3$-hybridized "spiro" carbon. The bond between the spiro-carbon and the oxazine will break upon irradiation of UV light, thus the ring opens, the spiro carbon achieves $sp^2$ hybridization and becomes planar. The aromatic group aligns its π-orbitals with the rest of the molecule by rotating to form a conjugated system. This conjugated system can absorb photons of visible light, so appear colorful. If the UV irradiation is stopped, the molecules gradually relax to their ground state, the carbon-oxygen bond reforms. The spiro-carbon becomes spa hybridized again, and the molecule returns to its colorless state.

Diarylethenes are another family of photochromic molecules increasingly studied, largely on account of their high thermodynamic stability. Some diarylethenes can achieve the color change while remaining in crystalline form, because they have so little shape change upon isomerization. For instance, the azobenzenes have been used extensively in molecular switches with its photochromic trans-cis isomerization. Incorporated into crown ethers, azobenzenes can work as switchable receptors; and in monolayers, while azobenzenes can provide light-controlled changes in surface properties.

Quinones, in particular phenoxynaphthacene and quinone itself, are also another popular class of photochromic molecules where the phenyl group can migrate from one oxygen atom to another to induce color changes. In addition to their high thermal stability, quinones also have the additional feature of redox activity that made a many-state molecular switches that can be operated by a mixture of photonic and electronic stimuli. Still, some inorganic substances such as silver chloride and zinc halides, exhibit photochromic properties, often with much better resistance to fatigue than organic photochromics.

Scientifically, the photochromic effect is the result of molecular configuration changing from one state to another state by absorbing photo, and two states have different energy levels corresponding to different absorption spectra, in particularly in visible range. Freedom is naturally required for a dye molecule to transform its molecular configuration such as from a close-ring configuration to an open-ring configuration as depicted in FIG. 1.

In theory, photochromic molecules can be dissolved in a solvent and have enough freedom to transform from one state to another by IN radiation, but a solid form is needed for any particular application such a photochromic lens or a smart window. Therefore, it is critic how to embed photochromic molecules into a solid matrix while still allow them to have freedom for transforming their molecular configuration inside the solid matrix.

In order to allow photochromic molecules transform their chemical configuration inside a matrix, the matrix has to have sufficient free volume inside, so photochromic molecules are able to transform from one form into another form under UV activation, and then revert to their original form upon removing UV activation. Therefore, the flexural modulus of the matrix is an important consideration for the photochromic molecule performance. For example, polymer with high flexural modulus, such as polycarbonate, PET and ABS, can lead to reduced photochromic response, and in such cases, the polymeric matrix is physically too stiff to allow the photochromic molecules to twist into their fully activated forms. On other hands, polymers of low flexural modulus such as LDPE, HDPE and polypropylene may be suitable media for exhibiting photochromic molecule activation. Commercially, when polymeric materials are used as matrixes to host photochromic molecules, the yield articles are also classified as photochromic plastic articles.

In practice, photochromic plastic articles can been prepared by incorporating the photochromic material into the plastic substrate with surface imbitions techniques. However, there are certain polymer matrices that are considered not to have sufficient free volume to allow imbibing photochromic materials for commercially acceptable photochromic applications. To allow the use of the polymer with high flexural modulus, such as thermoset polymers, thermoplastic polycarbonates, and highly cross-linked optical polymeric materials as plastic substrates for photochromic articles, it has been proposed to apply organic photochromic coatings to the surface of such plastic substrates. It has also been proposed to apply an abrasion-resistant coating onto the exposed surface of the photochromic coating to protect the surface of the photochromic coating from scratches and other similar cosmetic defects resulting from physical handling, cleaning and exposure of the photochromic coating to the environment. However, the intensity of the photochromism is limited by the thickness of the photochromic coatings. Consequently, both surface imbitions and surface coating have limited success for making any hard photochromic plastic articles. It is therefore the objective of this invention to disclose a hard plastic article with effective photochromic effect and method to make the same.

A hard plastic is technically correlated to a low flexural modulus, and the low flexural means less freedom for a photochoromic molecule to transform its molecular configuration inside this solid polymeric matrix. On the other hand as mentioned before, photochromic molecules can freely transform their molecular configurations in a liquid environment. Most photochromic molecules exhibit excellent photochromic performance in most common solvent, such as iso-propanol, acetone, chloroform, tetrahydrofuran, toluene, anisole, and other aromatic solvents. However, the liquid device is not practical, because some deficiencies, such as leaking of the liquid due to failure of a seal. As such, the question is that it is feasible to have a liquid droplet within the hard polymeric matrix while encapsuled photochromic molecules inside the liquid droplet. Obviously in order to keep the solid feature of the polymeric matrix, the size of liquid droplets to be embedded inside the polymer matrix shall sufficient small and not to distort the integral property of the polymer matrix. Such small liquid droplets to be embedded inside a solid matrix may be scientifically referred as microdroplets as well.

Indeed, films comprising microdroplets of liquid crystal materials dispersed in a polymeric matrix are known such as these were disclosed in U.S. Pat. Nos. 4,435,047; 4,579,423; 4,616,903 and 4,685,771. In these films, micron-size liquid-crystal droplets are dispersed in and surrounded by polymeric material. In the absence of an applied field, light passing through the film is strongly forward-scattered, giving the film a milky translucent appearance. When an electric field is applied, the liquid-crystal molecules become aligned and the film becomes transparent. Formation of uniform liquid-crystal droplets in a polymeric matrix can be achieved by one of a number of phase separation techniques, including polymerization, thermal processing, solvent evaporation, or emulsifying.

The concept using liquid microdroplets for controlling light transmission has been also adapted in another family of devices, where liquid microdroplets containing specific light-polarizing particles, and the said light-polarizing particles can be re-oriented in an electromagnetic field, and the re-orientation of the said light-polarizing particles can allow more light transmitted through. Such family of devices is generally referred as suspension particle display devices, and is disclosed by many patents, including U.S. Pat. Nos. 5,409,734, 546,391, 6,936,193, 7,791,788 and many patents cited in therein. For example, in U.S. Pat. No. 5,463,491, films for light controlling devices were made by phase separation of a mixture comprising a homogeneous polymeric solution and a liquid suspension of light-polarizing particles, where uniform liquid-suspension droplets in a polymeric matrix were formed by phase separation processing, e.g., by polymerization or solvent evaporation, and more specifically the polymerization was a kind of cross-linking which render the polymeric matrix into a solid d or semisolid polymeric film.

Following above discussions, it is now leading to our goal of the present invention, that is to make a solid plastic article, where photochromic molecules are encapsulated in liquid microdroplets, and these liquid microdroplets containing the said photochromic molecules are further embedded inside a polymeric matrix. According to this invention, the photochromic molecule molecules are capable of changing their molecular configurations reversibly upon activation by photo. Therefore, the solid plastic articles of photochromic effect can be convenient for transportation, storage, processing, and most importantly safety, so offer more potentials for commercial applications such as for smart windows.

SUMMARY OF THE INVENTION

The present invention now provides a solid photochromic plastic article, comprising a solid polymeric matrix having liquid microdroplets embedded inside the said solid polymeric matrix and the said liquid microdroplets containing photochromic molecules, and the said photochromic molecules are capable of reversibly transforming their chemical configurations upon photo activation and the transformed molecular configuration having different absorption spectrum in the visible region comparing to these untransformed molecular configuration, so exhibiting different color.

The present invention also discloses method to prepare the solid photochromic plastic articles by description of material selections and processing procedures, and further by illustration of experimental examples.

DETAILED DESCRIPTION OF THE INVENTION

The present invention provides a solid photochromic plastic article, comprising a solid polymeric matrix having liquid microdroplets embedded inside the said solid polymeric matrix and the said liquid microdroplets containing photochromic molecules, and the said photochromic molecules are capable of reversibly transforming their chemical configurations upon photo activation and the transformed molecular configuration having different absorption spectrum in the visible region comparing to these untransformed molecular configuration, so exhibiting different color.

Figure 1:
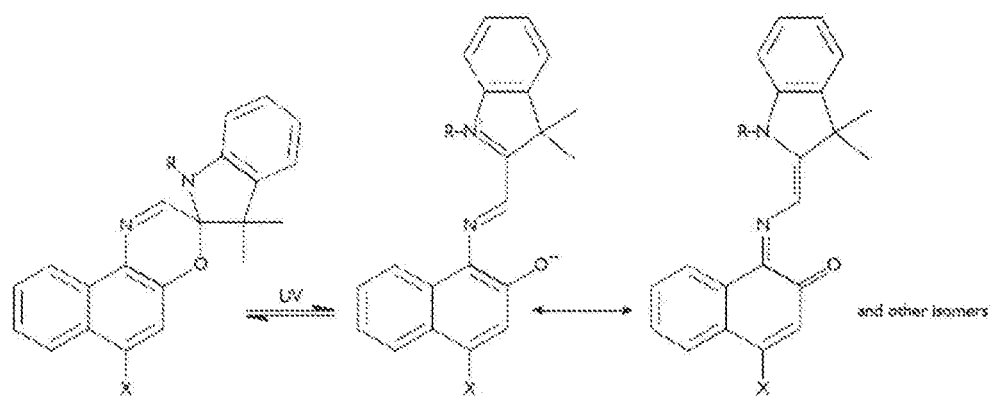
FIG. 1 shows transforming of molecular configuration a photochromic molecule upon photo activation, where the molecule is a typical family of spiro-naphthoxazines, and the color changing from colorless in the left to plum red in the right.
Figure 2:
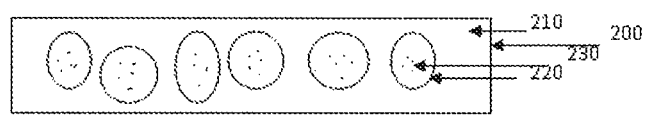
FIG. 2 presents schematically the photochromic plastic film, where the photochromic plastic film (200) consists liquids microdroplets (220) embedded in a polymeric matrix (210), and the said liquids microdroplets (220) containing photochromic molecules (230), and the said photochromic molecules (230) can be either in a solution form or in a dispersion form.

To better understand this invention, FIG. 2 presents a schematic view of a photochromic plastic film made according to this invention. In FIG. 2, the photochromic plastic film (200) consists liquids microdroplets (220) embedded in a polymeric matrix (210), and the said liquids microdroplets (220) containing photochromic molecules (230), and the said photochromic molecules (230) can be either in a solution form or in a dispersion form. In the state that no UV is applied on the film, the photochromic molecules dissolved in the microdroplets are in a molecular configuration with no visible color or called bleached state, so the light can pass through. When UV is applied on the film, the photochromic molecules dissolved in the microdroplets are transformed their molecular structure to another configuration with color or called colored state, then the light is significantly cut off.

Figure 3:
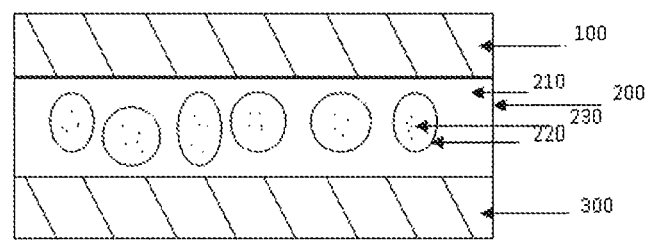
FIG. 3 presents schematically the photochromic light controlling device, wherein, a layer of photochromic layer (200) is sandwiched between two transparent substrates (100 and 300). The photochromic layer (200) consists liquids microdroplets (220) embedded in a polymeric matrix (210), and the said liquids microdroplets (220) containing photochromic molecules (230), and the said photochromic molecules (230) can be either in a solution form or in a dispersion form. The said two transparent substrates (100 and 300) can be the same or different materials. In one example, two identical transparent substrates are selected; therefore, the transparent substrate (100) is equivalent to transparent substrate (300).

In FIG. 3, the photochoromic plastic film consists of a light control layer (200) sandwiched between the two transparent substrates (100) and (300), and the light control layer (200) consists of polymeric matrix (210) containing light control microdroplets (220). In the state that no UV is applied on the film, the photochromic molecules dissolved in the light control droplets are bleached, the light can pass through. When UV is applied on the film, the photochromic molecules dissolved in the light control droplets are colored then the light is significantly cut off.

Many organic photochromic molecules are well known, including azobenzene-type compounds, thioindigo-type compounds, triarylmethanes-type compounds, stilbenes-type compounds, nitrones-type compounds, naphthopyrans-type compounds, quinones-type compounds, dithizone metal complexes, spiropyran-type compounds, spirooxazine-type compounds, fulgide-type compounds, dihydropyrene compounds, spirothiopyran-type compounds, 1,4-2H-oxazine, triphenylmethane-type compounds, viologen-type compounds, pyran-type compounds, etc. Of these compounds, spiropyran-type compounds, spirooxazine-type compounds and pyran-type compounds are excellent in the sensitivity to coloring and in the color density. However, these compounds involve a low rate of color reversion and reduce the color density or decolorize at a temperature higher than room temperature. Also, these organic photochromic compounds are so low in the stability to light that the compounds may decompose in a few days and become non-responsive to light, when coloring or decolorizing repeatedly occurs on intermittent irradiation or are subjected to continuous irradiation in air. To obviate this serious drawback, a hindered amine-type compound has been added to a high molecular-weight synthetic resin matrix along with the organic photochromic material to provide a resin matrix. However, the organic photochromic material containing the hindered amine-type compound in this form remains insufficient in the resistance to light although higher in this property than when free of a hindered amine-type compound, and is low in the sensitivity to coloring and in the rate of color reversion and poor in the color density because the organic photochromic compound is present as dispersed in the resin.

In this invention, the photochromic molecules are encapsulated in liquid microdroplets to obviate the above serious drawbacks, and these liquid microdroplets containing the said photochromic molecules are further embedded inside a polymeric matrix. The liquid in microdroplets protects the photochromic molecules from light, air and other chemicals, and while provides photochromic molecules a freedom for reversibly transforming their chemical configurations upon photo activation, Examples of organic photochromic compounds useful in the invention are conventional compounds such as spirooxazine-type compounds, spiropyran-type compounds and pyran-type compounds, etc. More specifically in one embedment, reversacol plum red (from Vivimed Labs Ltd.) was chosen as an example of phtochromic molecules for the fabrication of photochromic light control film with the improved structure in this invention.

Many solvents can be used as liquid dispersion medium to dissolve or disperse the photochromic molecules and to constitute microdroplets inside a polymeric matrix, therefore, the dispersion medium in this respect is also referred as the suspension medium. Suitable liquid suspension media are described in U.S. Pat. Nos. 1,951,664; 2,290,581; 3,625,869; 4,247,175; 4,442,019; and 6,936,193, for examples including esters, oils, aromatic alcohols, and aromatic esters. These suspension media can be used for dissolving or dispersing the photochromic molecules to make the solid plastic photochromic articles according to this invention. Further in accordance with an aspect of the invention, the liquid suspending medium is preferably incompatible or at most partially compatible with the selected polymeric matrix, and is inert with respect to the suspended or dissolved the photochromic molecules. Furthermore in order to reduce the amount of haze of the photochromic film, the difference of refractive index between the suspending medium and the polymeric matrix must not exceed 0.02. The suspending medium in the present invention can also be a plasticizer such as a phthalate including but not limiting to dioctyl phthalate, dibutyl phthalate, diisooctyl phthalate, butyloctyl phthalate, an isophthalate such as dioctyl isophthalate, an oleate such as butyl oleate, or n-propyl oleate, an adipate such as dioctyladipate, a benzoate such as diethyl glycol dibenzoate, or a trimellitate such as triethyl, or triisodecyl. In one embedment of this invention, diisooctyl phthalate was chosen as an example of the liquid dispersion medium to dissolve the photochromic molecules. To simplify the description of these examples of this invention, the microdroplets constructed by the dispersion medium containing photochromic molecules are also refereed as the light control droplets, LCD for short. In the embodiments exampled in this invention, the solid form of polymeric matrix (PM) is mostly formed by polymerization of the corresponding monomers or oligomers, referred as precursors (PPM) by photo-polymerization; thus a emulsion containing PPM, light control droplets and photoinitiator is formulated such that this emulsion can be coated onto a transparent substrate by traditional coating methods including doctor-blade coating, screen printing, slot-die coating, and then the wet coated layer is subsequently solidified (or named cured) by exposure to a ultraviolet (UV) irradiation.

The liquid cross-linkable oligomer or polymer (PPM) and the liquid dispersion medium (LDM) are so chosen that the components of one will not deleteriously affect the other. Moreover, the cross-linking, agent used to form the cross-linked polymer matrix, the by-products of the cross-linking reaction, if any, and the cross-linking conditions, e.g. temperature, pressure etc. must also be compatible with and not adversely affect the light control droplets (LCD).

The preferable liquid cross-linkable oligomers suitable as precursors of polymer matrix (PPM) include cross-linkable polyorganosiloxane, polybutadiene, polystyrene, poly(cyclopropene), polyamide, polyolefin, silicone gum, polyacrylamide, polyurethane, and the like. The preferable precursors of polymer matrix may inherently have functional groups that enable it to be cross-linked, such as a polyacrylamide, or it may comprise a polymeric chain that has been modified to include such functional groups, such as a dihydroxy terminated polydimethylsiloxane. Cross-linkable functional groups are known in the art and include polyacrylates, polymethacrylates, polyethers, polymethylstyrenes, alkyd resins, polyamides, polyurethanes, polycarbonates, epoxy resins, and the like. Further the preferable PPM may have two or more cross-linkable functional groups per molecule, and may even comprise a large number of such groups provided that the solubility requirements previously stated herein are met. Such cross-linkable functional groups may be located not only at or near the ends of the main chain but also along the main chain and may be substituted either directly to the main chain or on groups pendant from the main chain. In one embedment of this invention, liquid photo-curable polysiloxane was chosen as an example to form the polymeric matrix layer.

According to this invention as illustrated in FIG. 2, the said polymeric matrix layer is preferably a high light transmittance plastic material. More preferably, the said polymeric matrix 210 can be formed by photo-curing, so the shrinkage of this layer can be technically controlled. Still more preferably, the said polymeric matrix layer is a cross-linked polysiloxane formed from liquid siloxane copolymer with ethylenically unsaturated bond by photo-curing method described in U.S. Pat. Nos. 6,900,923 and 7,791,788. As stated above, the photo-curable polysiloxane which is used to form the polymeric matrix layer 200 is referred as the polymeric matrix precursor (PPM) in this invention. The optical transmittance is related to the thickness of the layer, and such, a thickness is preferably between 50-1000 μm, more preferably, 100-250 μm.

Practically according to this invention, the said precursors of polymer matrix material (PPM), the said light control droplets (210) material are formulated into an emulsion. The emulsion can be applied onto the surface of a substrate by conventional coating methods to form a wet coated layer, and then the wet coated layer can be solidified by photo-polymerization of precursors of polymer matrix via a conventional ultraviolet (UV) irradiation.

Still in common, the layer 100 is transparent substrates, which are commercially available as PVDF, PET, Polyimide (PI), and polymer carbonate (PC).

Hereinafter, the present invention will be more specifically described by way of examples, and these examples are not to be constructed as limiting the present invention in any manner.

EXAMPLES

In the following examples, the commercially PET film was selected as the transparent substrates, and the light transmittance of the PET film is 90%. The selected polymeric matrix precursor is a liquid siloxane copolymer with ethylenically unsaturated bond, which is synthesized by following similar method that described in U.S. Pat. Nos. 6,900,923 and 7,791,788. The selected dispersion medium is diisooctyl phthalate. The selected photochromic molecular dye is Reversacol plum red which is commercially available from Vivimed Labs Ltd. All chemicals used in the examples are purchased from Sigma-Aldrich company unless otherwise specified. The doctor blade coater (Model: MSK-AFA-III-110, MTI Corporation) was used to coat the photochromic light control emulsion onto the selected substrate. The UV light source is a commercially available metal halide lamp having a cumulative light dose of 500 mJ/cm$^2$.

Example 1

In a 50 ml glass flask, 0.02 g of photo initiator (PI), bis(2,4,6-trimethylbenzoyl) phenylphosphine oxide, was first dissolved in 5 g of acetone. Then 20 g of the elected precursor of polymeric matrix (PPM) was added. After thoroughly mixing by shaking, acetone was subsequently removed by a rotary evaporator to yield a liquid solution, referred as PPM-PI, which is reserved for further use in formulating the photochromic light control emulsion.

In another 50 ml glass flask, 0.08 g of reversacol plum red (from Vivimed Labs Ltd.), used as photochromic dye molecule (PD), was first dissolved in 20 g isoamyl acetate. Then 10 g of diisooctyl phthalate, as dispersion medium (DM), was added. After thoroughly mixing by shaking, isoamyl acetate was subsequently removed by a rotary evaporator to yield a liquid suspension referred as PD-DM.

The photochromic emulsion (PCE-1) was then formulated by mixing 10 g of PD-DM liquid suspension prepared above with 12.5 g of PPM-PI solution prepared above in a separate 50 ml glass flask.

In this example, the photochromic emulsion (PCE-1) prepared above was coated onto the selected PET film by the doctor blade to produce a wet thickness of 200 μm at room temperature under a coating speed of 10 mm/s. The coated wet emulsion was exposed to the UV light source for 40 seconds to yield a solid light control layer on PET sheet (referred as LCL/PET). Another fresh sheet of PET without light control layer was finally laminated with this LCL/PET at room temperature to complete the assembly of the photochromic device or referred the solid plastic photochromic article (PCD-1). Thus, PCD-1 was made according to this invention, where photochromic molecule molecules are suspended in a liquid medium, and the liquid medium form micro-droplets inside a solid polymer matrix, therefore yields a solid plastic article containing suspended photochromic molecules.

Example 2

In this example, a comparative example is prepared as follows. In a 50 ml glass flask, 2 g of PMMA was first dissolved in 20 g of acetone. Then 40 mg of reversacol plum red (from Vivimed Labs Ltd.) was added to the PMMA solution to form a photochromic emulsion (PCE-2). The photochromic emulsion (PCE-2) prepared above was coated onto the selected PET film by dip coating to produce a wet thickness of 200 um at room temperature. The coated wet emulsion was dried in air for about 1 hour to yield a photochromic dye containing PMMA layer coating on the PET substrate, which is referred as a comparative photochromic device (PCD-2). PCD-2 was not made according to this invention where dye molecules are not suspended in a polymeric material in any form of micro-droplets.

Example 3

Figure 4:
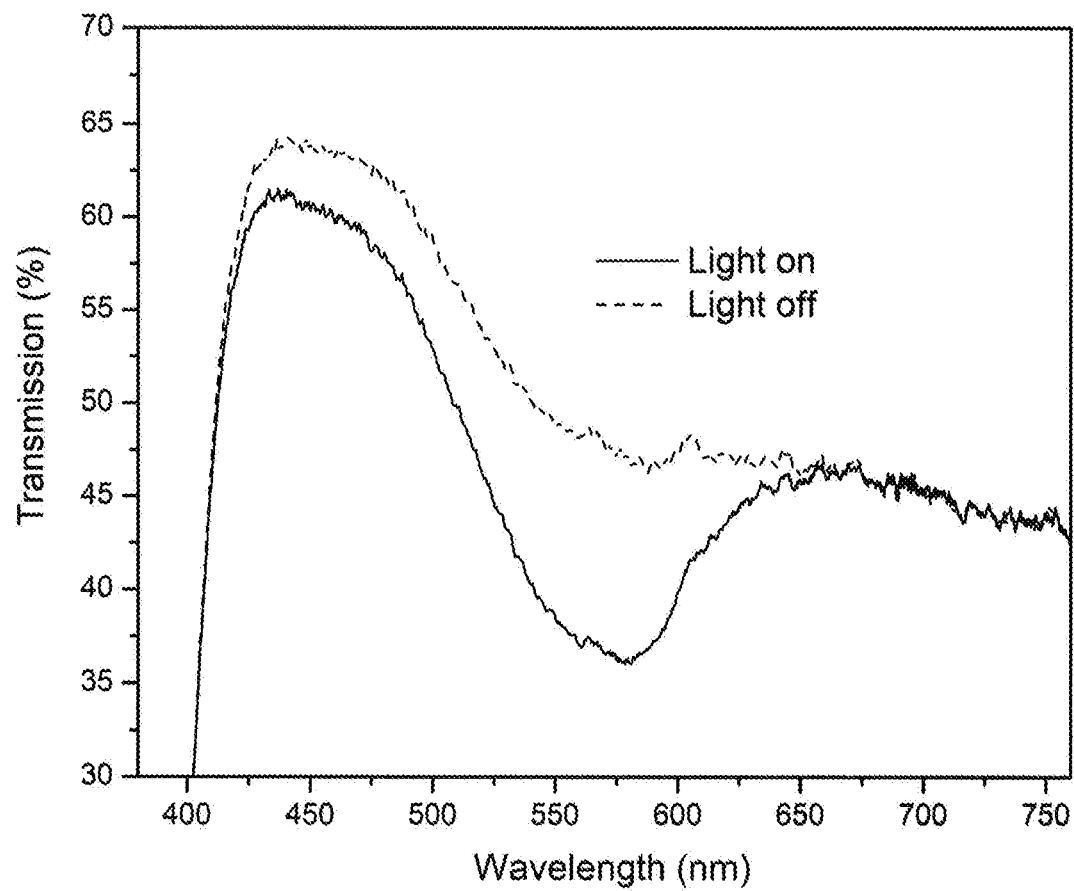
FIG. 4 is the absorption spectra of a photochromic plastic film exampled in this invention with and without UV activation.

In this example, devices made in the Example and Example 2 are tested and evaluated in parallel. First, PCD-1 and PCD-2 were exposed to outdoor sunlight at the same time. Under the same condition, PCD-1 exhibited color change from colorless to pink in few seconds while PCD-2 did not observed any color change with a minute. Secondly, the absorption spectrum of the PCD-1 and PCD-2 was further measured by an Oceanview spectrometer. FIG. 4 presents visible light transmittance spectra of the PCD-1 under an irradiation of xenon lamp (CHF-XM35-500W, ON State) and without irradiation of the xenon lamp (OFF-State). From FIG. 4, it can be seen that PCD-1 prepared according to this invention exhibited excellent light transmittances at OFF-State but significantly shield light in the wavelength of 430 to 650 nm when it is in ON-state. No such a photochromic effect was observed from PCD-2 prepared in a way different from this invention.

What is claimed is:

1. A plastic article containing suspended photochromic dye molecules, wherein photochromic dye molecules are suspended in liquid micro-droplets of a suspension medium, and the said micro-droplets of the said suspension medium are embedded inside a solid polymer matrix, and the said solid polymer matrix is formed by polymerization of liquid polymer precursors, wherein the suspended photochromic dye molecules are spirooxazine compounds, or spiropyran compounds or pyran compounds or a mixture of any of these compounds.

2. The plastic article according to claim 1, wherein the plastic article is in a film form.

3. The plastic article according to claim 1, wherein the plastic article is coated on a transparent substrate.

4. The plastic article according to claim 1, wherein the plastic article is sandwiched between two identical transparent substrates.

5. The plastic article according to claim 1, wherein the plastic article is sandwiched between two different transparent substrates.

6. The plastic article according to claim 1, wherein the suspended photochromic dye molecules are also selected from the group consisting of reversacol plum red, reversacol oxford blue, reversacol rush yellow and a mixture of any of these photochromic dye molecules.

7. The plastic article according to claim 1, wherein the suspension medium includes esters, oils, aromatic alcohols, aromatic esters, or a mixture thereof.

8. The plastic article according to claim 1, wherein the suspension medium includes phthalate, isophthalate, oleate, adipate, benzoate, trimellitate, or a mixture thereof.

9. The plastic article according to claim 1, wherein the said polymeric matrix is polyorganosiloxane, polybutadiene, polystyrene, poly(cyclopropene), polyamide, polyolefin, silicone gum, polyacrylamide, polyurethane, polyacrylates, polymethacrylates, polyethers, polymethylstyrenes, alkyd resins, polyamides, polyurethanes, polycarbonates, epoxy resins, or a mixture thereof.

10. The plastic article according to claim 1, wherein the said polymeric matrix comprises a polyorganosiloxane.

\* \* \* \* \*